3,389,081
METHOD OF REMOVING ALKYL ARYL SULFONATES AND PHOSPHATES FROM WASTE WATER
William Wesley Eckenfelder, Jr., Ramsey, N.J., and Edwin L. Barnhart, Woodhaven, N.Y., assignors to McGraw-Edison Company, Elgin, Ill., a corporation of Delaware
Filed May 1, 1964, Ser. No. 364,072
9 Claims. (Cl. 210—52)

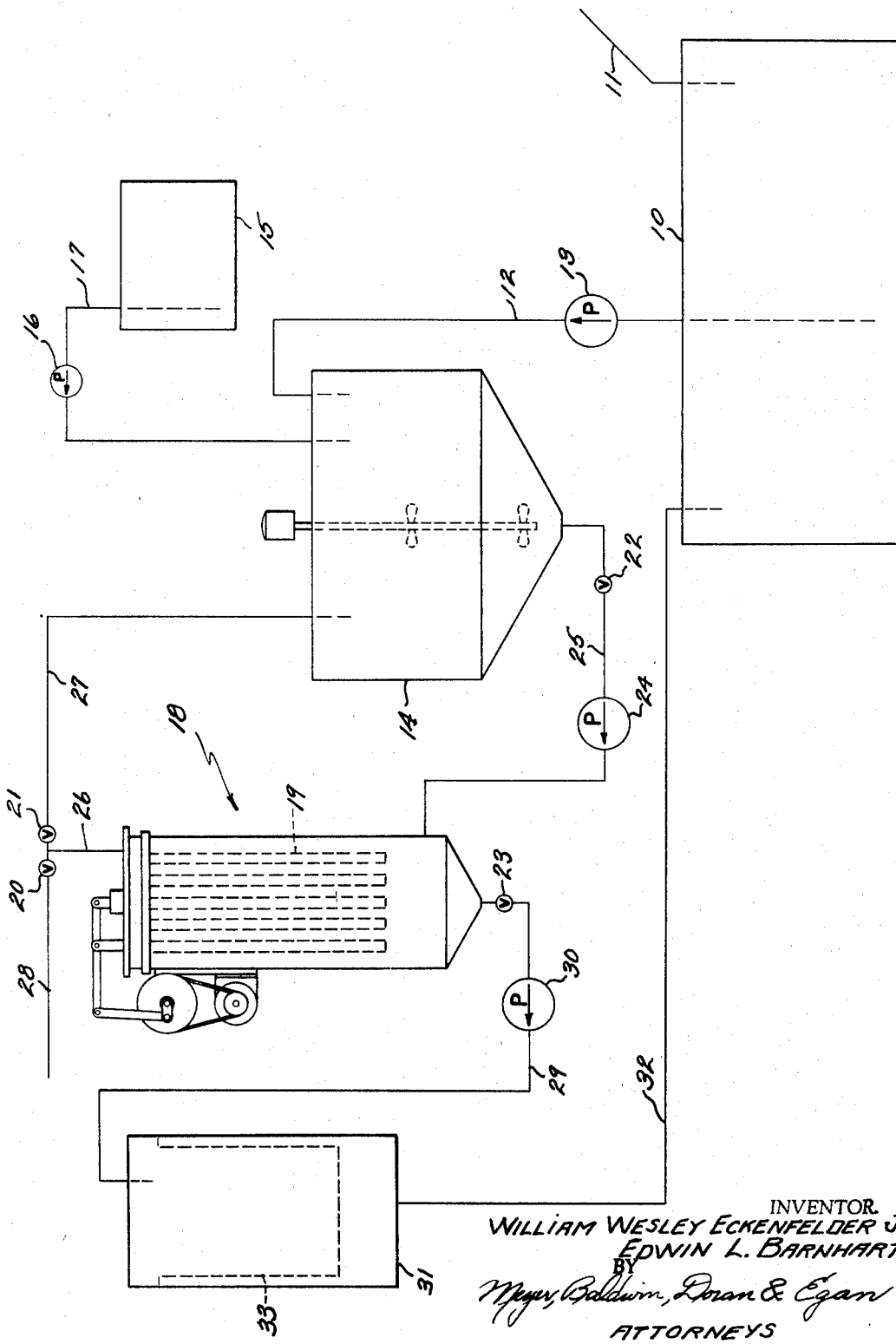

ABSTRACT OF THE DISCLOSURE

A method of removing alkyl aryl sulfonates and phosphates from waste water by complexing the sulfonates with a quaternary ammonium compound, forming a disperse precipitate; complexing the sulphates with a calcium salt, forming an insoluble phosphate, which then flocs the disperse precipitate from the waste water.

---

This invention relates to apparatus for and methods of removing alkyl aryl sulfonates from waste water.

Inasmuch as alkyl aryl sulfonate is biologically degradable only to a very limited extent, its presence in waste waters such as coin-operated laundry water causes many problems and it is generally desirable, and in some cases necessary, to remove the alkyl aryl sulfonate to prevent contamination of ground surface waters that are used as sources for drinking water. Among the problems caused by the use of the alkyl aryl sulfonate are the influence of the sulfonate on the taste and odor of drinking water, the foaming of water in lakes and streams, the foaming of water at sewage treatment plants, and even the foaming of home tap water.

Therefore, it is an object of the present invention to provide apparatus for and methods of removing the alkyl aryl sulfonate from waste water.

It is an object of the present invention to provide methods for removing alkyl aryl sulfonates and particularly, alkyl benzene sulfonates, from laundry waste water such as the discharge water from coin-operated laundries.

It is an object of the present invention to provide apparatus and methods for economically and automatically removing alkyl benzene sulfonate and soluble phosphate from coin-operated laundry water by chemical treatment and subsequent removal of the sulfonate as a part of a precipitate.

It is an object of the present invention to remove alkyl aryl sulfonates from laundry waste water containing said sulfonates and soluble phosphates by mixing the waste water with a quaternary ammonium compound to form a precipitate, flocculating the precipitate by adding to the water a calcium salt to form calcium phosphate in situ, and thereafter removing the flocculated precipitate from the waste water.

These and other objects will be apparent from the specification that follows, the appended claims, and the drawings in which:

The figure is a schematic diagram of the apparatus embodying the present invention, the diagram also illustrating the methods of removing alkyl aryl sulfonates from waste water;

The present invention provides a method of removing alkyl aryl sulfonates including alkyl benzene sulfonate (hereinafter abbreviated ABS) from waste water such as laundry waste water containing ABS and soluble phosphate by (1) mixing the waste water with a quarternary ammonium compound to form a precipitate that is a reaction product of the ABS and the above mentioned ammonium compound, (2) flocculating the precipitate with a calcium salt such as calcium chloride that forms calcium phosphate in situ, and (3) removing the flocculated precipitate from the water preferably by filtering with a diatomaceous earth filter aid to provide a treated water that can be disposed of in streams, lakes or water treatment systems without danger of adding to the build-up of ABS therein. In removing ABS, for instance, in coin-operated laundry waste water containing about 60 p.p.m. (parts per million) ABS, for best results about 1.1 parts by weight of a quarternary ammonium compound that is preferably alkyl ($C_9H_{19}$ to $C_{15}H_{31}$) benzyl dimethyl ammonium chloride is used per 1 part by weight of ABS to form a finely divided precipitate that remains suspended in the water. The precipitate is flocculated preferably by adding about, at pH of about 7, four pounds of calcium chloride per 1000 gallons of waste water to coagulate the precipitate, and thereafter removing the flocculated precipitate preferably by filtering using diatomaceous earth as a filter aid. The resultant treated laundry waste water is free from ABS or, at least, has an ABS content of substantially less than 0.5 p.p.m.

Inasmuch as a detergent used in a coin-operated laundry generally contains a mixture of about 70% to 90% by weight of a phosphate builder such as trisodium phosphate or sodium tripolyphosphate and about 10% to 30% of a surface active agent such as ABS, it is desirable to remove the phosphates as well as the sulfonates. In the present process, advantage is taken in the present invention of the presence of soluble phosphates to form calcium phosphate in situ to coagulate the precipated ABS-cationic complex.

The present invention also includes apparatus for practicing the above described methods, which apparatus comprises a holding tank 10 which is filled with waste laundry water by pipe 11. The waste water is moved from the holding tank 10 through conduit 12 by means of pump 13 into a mixing tank 14. Chemical additive tank 15, containing alkyl dimethyl benzyl ammonium chloride and a calcium salt such as calcium chloride, is used to store the chemical additive ingredients. The chemical additive solution is pumped from the additive tank 15 into the mixing tank 14 by pump 16 through line 17. After a precipitate has been formed by the reaction of the alkyl dimethyl benzyl ammonium chloride and ABS, and flocculated by calcium chloride or another calcium salt, the waste water containing the flocculated precipitate is pumped to the filter 18 where the flocculated precipitate is removed.

The filter 19, a McLagan filter which may have a filtering area of about seven to ten square feet for processing about 400 to 500 gallons of laundry waste water in 10 to 15 cycles, has a plurality of filter tubes 19. A suitable means of cleaning the filter tubes is provided, one such means comprising a motor-driven linkage which causes a longitudinal reciprocation of a helical spring which fits loosely over each of the tubes 19. The tubes can also be jarred or the filter cake removed therefrom by some other suitable means after the precipitate has been deposited thereupon and the flow rate through the filter has fallen off. Two filters, such as illustrated by filter 18, can be used in parallel to get a greater filtering capacity. For instance, two-45 tube filters can be used to process approximately 10,000 gallons of waste water in say, 10 cycles. With these two filters, 40 pounds of diatomaceous earth can be dumped into the mixing tank at the start to form a filter cake around each of the tubes and more added, as desired, during or after each of the filtering cycles.

At the start of the filtering operation, valve 20 is closed and valve 21 open. Valve 22, located in line 25 between the mixing tank 14 and the filter 18, is open. Located in a line below the filter 18 and leading away therefrom is valve 23, which valve is closed. Pump 24, located between valve 22 and the filter 18, delivers the powdered diatomaceous earth and water to the filter to initially build up a cake on each of the tubes. The water that carries the diatomaceous earth to the filter is recirculated to the mixing tank through line 26 and line 27.

After the cake is deposited in the desired thickness, valve 21 is closed and valve 20 opened whereby treated and filtered water is delivered from the unit through line 28.

As the flow rate through the filter drops off during operation so that it becomes advantageous to clean the filter, pump 24 is stopped and the filter tubes cleaned. Valves 20 and 21 are put in bypass position with 20 closed and 21 open, and pump 24 started whereupon the diatomaceous earth filter aid is again deposited on the tubes. Valves 20 and 21 are then changed from the bypass arrangement and a new cycle is started. These cycles are continued until there is an undesirably large amount of foreign matter in the diatomaceous earth deposit. Valve 23 is then opened and the filter emptied through a discharge pipe 29 by suitable means such as by pump 30 or by gravity flow.

In the embodiment shown in the drawings, the sludge-water mixture discharged through pipe 29 can go into a receptacle 31 containing a sludge-catching bag 33 which removes the solid matter from the sludge-water mixture. The balance of the waste water from the sludge-water mixture is returned to the holding tank 10 through line 32.

The ABS material removed by the methods and apparatus of the present invention generally comprise alkali metal salts of alkyl aryl sulfonates such as alkyl benzene sulfonates and alkyl naphthyl sulfonates. The alkali metal of the salt is generally sodium but the metal also can be potassium or even lithium. Specifically, the sulfonates include propylnaphthyl sulfonate, polypropylnaphthyl sulfonate, dodecyl benzene sulfonate and polypropyl benzyl sulfonate. These materials are degraded only to a very limited extent by the action of bacteria and, as previously indicated, the introduction of at least one part by weight of alkyl dimethyl benzyl ammonium chloride or dialkyl methyl benzyl ammonium chloride per one part by weight of the sulfonate is required to form a precipitate, which precipitate is thereafter removed by calcium phosphate that is formed in situ to coagulate said precipitate.

portion of it being converted by high temperature washing operations to the ortho form from the original polyphosphate form ordinarily present in the detergent.

As was previously indicated, the ABS complex that is formed with the cationic quaternary ammonium chloride is a highly dispersed precipitate and cannot be removed from the waste water by methods such as standing and settling or by normal filtration such as filtering with a sand filter. It has been found that about 90 to 110 mg./l. of calcium phosphate and preferably about 100 mg./l. is generally necessary to insure complete precipitation of the ABS complex.

The precipitation of phosphate by the in situ formed calcium salt is dependent upon pH, the pH being preferably at least 7 and, sometimes in order to produce the minimum amount of about 100 mg./l. of calcium phosphate, an adjustment in the pH to a more alkaline condition is desirable, a pH of 7.1 to 9 being highly effective. A higher pH, such as 11, can be used but little difference is observed in the precipitation characteristics of the resulting solution and a solution having a pH of about 9.

The following examples are intended to illustrate rather than limit the present invention:

Example 1

Laundry waste water discharges from a commercial coin-operated laundry were treated to remove the ABS therefrom. Approximately 433 gallons of waste water was filtered through 15 cycles, each cycle having a duration of about 15 minutes at which time the filtration pressure increased rapidly and the rate of water moved through the filter fell off.

In each of these runs in which approximately 433 gallons of waste water was processed, calcium chloride was used as the coagulant and alkyl dimethyl benzyl chloride was used as the cationic precipitation agent, the alkyl group containing from 8 to 18 carbon atoms. In each run, four pounds of diatomite (diatomaceous earth) was used as a precoat for the seven sq. ft. filter employed (see filter 18 in the drawings). The ABS in the influent and effluent is set forth in the table below along with other pertinent data:

TABLE I

| Run No. | ABS Inf. | ABS Eff. | BOD Inf. | BOD Eff. | CaCl₂ No./1,000 gal. | CaCl₂ Mg./l. | Cat. No./1,000 gal. | Cat. Mg./l. | pH Inf. | pH Eff. | PO₄ Inf. | PO₄ Eff. |
|---|---|---|---|---|---|---|---|---|---|---|---|---|
| 1 | 80 | 0.2 | 243 | 115 | 1 | 120 | 1 | 240 | 6.9 | 7.0 | 255 | 230 |
| 4 | 70 | 2.0 | 226 | 93 | 5 | 600 | 1.6 | 192 | 7.0 | 6.8 | 250 | 160 |
| 5 | 70 | 0.7 | 222 | 81 | 4 | 480 | 1.6 | 192 | 7.0 | 6.9 | 275 | 150 |
| 6 | 50 | 0.3 | 284 | 95 | 3 | 360 | 1.2 | 144 | 7.0 | 6.9 | 275 | 140 |

The preferred quaternary ammonium compounds are alkyl dimethyl benzyl ammonium chlorides in which the alkyl group has generally 12, 14 and 16 carbon atoms although other related alkyl groups having 8 to 18 carbon atoms are also usually present. These quaternary ammonium chlorides are generally supplied in aqueous solutions containing about 10% by weight of the chlorides as the active ingredients, one such commercially obtainable being Roccal, an alkyl dimethyl benzyl ammonium chloride sold by Sterwin Chemicals, Inc. New York, New York.

Another preferred ammonium compound commercially available is Winroc, methyl alkyl ($C_9H_{15}$—$C_{15}H_{31}$) benzyl trimethyl ammonium chloride also sold by Sterwin Chemicals, Inc., New York, N.Y.

As to the soluble phosphate that is generally present in the amount of 240 or 250 up to 275 or 280 mg./liter in coin-operated laundry waste water, apparently nearly all the phosphate is present in the ortho form, a major As is indicated from Table I, the average values obtained by treatment of laundry waste water employing calcium chloride as a coagulating agent are as follows:

TABLE II

| | Influent | Effluent |
|---|---|---|
| ABS, mg./l. | 63 | 0.1 |
| BOD, mg./l. | 243 | 90 |
| COD, mg./l. | 572 | 171 |
| Total Solids, mg./l. | 1,270 | 1,050 |
| Volatile Solids, mg./l. | 379 | 110 |
| Phosphate, mg./l as PO₄ | 267 | 150 |
| Chlorides, mg./l as Cl | | 275 |
| Salt added, mg./l. | 480 | |
| Cationic added, mg./l. | 188 | |

Example 2

Another series of coin-operated laundry waste water batches were treated for removal of ABS by use of alkyl dimethyl benzyl chloride as the cationic precipitating agent and lime as the flocculating agent. Four pounds of diatomaceous earth was used as a precoat for each cycle, there being seven cycles of 30 minutes each. The results of the treatment are shown in the table that follows:

TABLE III

| Run No. | ABS | | BOD | | CaO | | Cat. | | pH | | PO₄ | |
|---|---|---|---|---|---|---|---|---|---|---|---|---|
| | Inf. | Eff. | Inf. | Eff. | No./1,000 gal. | Mg./l. | No./1,000 gal. | Mg./l. | Inf. | Eff. | Inf. | Eff. |
| 1 | 40 | 3.5 | 214 | 85 | 2.4 | 290 | 1.9 | 230 | 6.9 | 9.7 | 260 | 39 |
| 2 | 40 | 0.7 | 224 | 89 | 4.0 | 480 | 2.0 | 240 | 6.9 | 9.9 | 260 | 40 |
| 3 | 40 | 0.1 | 220 | 34 | 6.0 | 720 | 4.0 | 480 | 6.9 | 11.0 | 280 | 1.5 |
| 4 | 48 | 0.1 | 210 | 52 | 4.0 | 480 | 1.8 | 216 | 6.9 | 11.0 | 270 | 0.9 |
| 5 | 45 | 0.6 | 218 | 74 | 3.0 | 360 | 1.6 | 192 | 6.9 | 9.7 | 270 | 32 |

In the above examples, other previously described quaternary ammonium compounds can be used in place of the particular quaternary ammonium chloride used to obtain nearly equivalent results. One highly preferred quaternary ammonium compound is dialkyl methyl benzyl ammonium chloride in which the alkyl radicals have from 8 to 18 carbon atoms. Another preferred compound is alkyl dimethyl benzyl ammonium chloride in which the alkyl group is a mixture of radicals from $C_9H_{19}$ to $C_{15}H_{31}$. Generally, about 1 to 4 pounds of the cationic ammonium compound can be used per 1000 gallons of waste water, the preferred amount being about 1.5 to 2 pounds.

As indicated in the examples, generally about 2 to 6 pounds of the calcium salt can be used to flocculate the precipitate, the preferred amount being about 3.5 to 4.5 pounds per 1000 gallons of waste water.

Likewise, in the above examples, nearly equivalent results can be obtained by using other calcium salts such as calcium carbonate at a pH of at least 7 to flocculate the precipitated ABS-cationic complex.

As seen in the working examples, the BOD (biochemical oxygen demand) is also advantageously reduced in the process of the present invention. As noted in Table II (using calcium chloride) the BOD was reduced from 243 to 90 mg./l. Likewise the COD, total solids and phosphate contents were reduced.

In the above examples, although diatomaceous earth is highly preferred as a filter aid material, other filter aids such as precipitated calcium carbonate can be employed. Such filter aids, and especially the diatomaceous earth, is preferably added to the waste water before the filtering run begins, although, in some cases, small amounts of diatomaceous earth can be added during each cycle of a particular run. In any event, as indicated in the examples, the total amount of diatomaceous earth used for each 500 gallons of waste water is preferably about 25 to 60 pounds. However, generally from 4 to 80 pounds or more can be used to effectively process 500 gallons of laundry waste water.

It is to be understood that from the foregoing description, further modifications of the present invention may be made without departing from the spirit and scope thereof.

What is claimed is:

1. A method of removing alkyl aryl sulfonates from waste water containing about 40 to 80 mg./l. of said sulfonates and about 250 to 275 mg./l. of soluble phosphates, said method comprising the steps of (1) mixing the waste water containing the sulfonates with about 1.1 parts by weight of an alkyl dimethyl-benzyl-ammonium chloride in which the alkyl group contains from 8 to 18 carbon atoms per one part by weight of said sulfonate to provide a precipitate, (2) flocculating said precipitate by adding at a pH of at least about 7 a calcium salt to form about 100 mg./l. of calcium phosphate in situ that flocculates said precipitate, (3) adding diatomaceous earth to the waste water as a filter aid, and (4) removing said flocculated precipitate by filtering the waste water.

2. A method of removing alkyl benzene sulfonate from waste laundry water, the method comprising the steps of (1) mixing (a) waste laundry water containing an alkali metal alkyl benzene sulfonate in which the alkyl radical has 8 to 18 carbon atoms and soluble phosphate, and (b) about 1.1 parts by weight per one part by weight of said sulfonate of an alkyl dimethyl-benzyl-ammonium chloride in which the alkyl radical has 8 to 18 carbon atoms to form a precipitate in the waste water mixture, (2) flocculating said precipitate by mixing therewith about 2 to 6 pounds of calcium chloride per 1000 gallons of the waste water mixture at a pH of about 7, and (3) filtering said flocculated precipitate using about 2 to 80 pounds of diatomaceous earth per 1000 gallons of said waste water mixture.

3. A method of removing alkyl benzene sulfonate from laundry waste water containing about 70 mg./l. of alkyl benzene sulfonate in which the alkyl radical has 8 to 18 carbon atoms and about 275 mg./l. of soluble phosphate, the method comprising the steps of (1) mixing with the waste laundry water with about 192 mg./l. of alkyl dimethyl-benzyl-ammonium chloride to provide a precipitate, (2) flocculating the precipitate by mixing in the waste water about 480 mg./l. of calcium chloride at a pH of about 7, and (3) removing the flocculated precipitate from the waste water by filtration using diatomaceous earth as a filter aid.

4. A method of removing alkyl benzene sulfonate from laundry waste water containing about 63 mg./l. of alkyl benzene sulfonate in which the alkyl radical has 8 to 18 carbon atoms and about 267 mg./l. of soluble phosphate, the method comprising the steps of (1) mixing with the waste laundry water with about 88 mg./l. of alkyl dimethyl-benzyl-ammonium chloride to provide a precipitate, (2) flocculating the precipitate by mixing in the waste water about 480 mg./l. of calcium chloride at a pH of about 7, and (3) removing the flocculated precipitate from the waste water by filtration using diatomaceous earth as a filter aid.

5. A method of removing alkyl aryl sulfonates and phosphates from waste water containing the same, comprising the steps of (1) mixing said waste water with a quaternary ammonium compound in an amount sufficient to complex with a substantial portion of said sulfonates, forming a highly dispersed precipitate; (2) mixing said waste water with a calcium salt in an amount sufficient to react with a substantial portion of said phosphates whereby said substantial portion is insolubilized as calcium phosphate, which in turn assists in flocculating said highly dispersed precipitate; and (3) separating said flocculated precipitate from said waste water, thereby reducing substantially its sulfonate and phosphate content.

6. The method as defined in claim 5 wherein step (3) includes adding a filter aid to said waste water and filtering to separate said flocculated precipitate therefrom.

7. The method as defined in claim 5 wherein step (2) is conducted at a pH of at least about 7.

8. The method as defined in claim 5 wherein said quaternary ammonium compound is selected from the group consisting of methyl alkyl- and alkyl dimethyl-benzyl ammonium chlorides, and mixtures thereof, wherein said alkyl is of $C_8$–$C_{18}$.

9. The method as defined in claim 5 wherein said calcium salt is selected from the group consisting of calcium chloride and calcium carbonate.

References Cited

UNITED STATES PATENTS 3,200,069   8/1965   Eisenhaver     210—63

OTHER REFERENCES

Vaughn, J. C., et al., Detergents In Water Supplies, Ind. and Eng. Chem., vol. 48, February 1956, pp. 241–245 (Copy in Gp. 171) 210–42.

Flynn, J. M., et al., Launderette Waste Treatment Processes, Journal WPCF, vol. 35, June 1963, pp. 791–798 relied on (POSL).

MICHAEL E. ROGERS, *Primary Examiner.*